United States Patent
Kumar et al.

(10) Patent No.: US 10,373,499 B1
(45) Date of Patent: Aug. 6, 2019

(54) COGNITIVELY FILTERED AND RECIPIENT-ACTUALIZED VEHICLE HORN ACTIVATION

(71) Applicant: International Business Machines Corporation, Armonk, NY (US)

(72) Inventors: Jayashree Kumar, Bangalore (IN); Yethish Venkataramanachari, Kolar Gold Fields (IN); Dhandapani Shanmugam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/958,174

(22) Filed: Apr. 20, 2018

(51) Int. Cl.
| | |
|---|---|
| *G08G 1/16* | (2006.01) |
| *B60W 50/16* | (2012.01) |
| *G06K 9/00* | (2006.01) |
| *H04W 4/46* | (2018.01) |
| *B60W 50/14* | (2012.01) |

(52) U.S. Cl.
CPC ............ *G08G 1/162* (2013.01); *B60W 50/16* (2013.01); *G06K 9/00791* (2013.01); *H04W 4/46* (2018.02); *B60W 2050/143* (2013.01); *B60W 2050/146* (2013.01); *B60W 2550/22* (2013.01)

(58) Field of Classification Search
CPC ......... A61B 5/746; G08G 1/166; G08G 1/167
USPC ....... 340/425.5, 435, 902–906, 572.1, 573.1, 340/384.1; 701/300, 301
See application file for complete search history.

(56) References Cited

U.S. PATENT DOCUMENTS

| | | | |
|---|---|---|---|
| 9,475,461 | B1 | 10/2016 | Pudiyathanda et al. |
| 9,483,941 | B1 | 11/2016 | Childress et al. |
| 2003/0141990 | A1 | 7/2003 | Coon |

(Continued)

FOREIGN PATENT DOCUMENTS

| | | |
|---|---|---|
| WO | 03/085619 A1 | 10/2003 |
| WO | 2015/054352 A1 | 4/2015 |
| WO | 2017/068392 A1 | 4/2017 |

OTHER PUBLICATIONS

Jen Clark, "What is M2M technology?", https://www.ibm.com/blogs/internet-of-things/what-is-m2m-technology, Oct. 20, 2106, 10 pages.

(Continued)

*Primary Examiner* — Joseph H Feild
*Assistant Examiner* — Sharmin Akhter
(74) *Attorney, Agent, or Firm* — Nicholas D. Bowman; Madeline F. Schiesser; Keohane & D'Alessandro PLLC

(57) ABSTRACT

Approaches presented herein enable recipient-actualized internal vehicle-to-vehicle honking. More specifically, an action of a first vehicle is monitored and a communication is obtained from a second vehicle. In response to the obtainment of the communication, it is determined whether the action of the first vehicle violates a rule. In the case that the action of the first vehicle violates a rule, responsive to the communication, a honk indication, perceptible to an occupant of the first vehicle, is actualized inside the first vehicle. In the case that the action of the first vehicle does not violate a rule, the communication from the second vehicle is rejected, and the honk indication is not actualized inside the first vehicle. A response can be transmitted to the second vehicle indicating if the honk indication was actualized inside the first vehicle.

19 Claims, 5 Drawing Sheets

(56) References Cited

U.S. PATENT DOCUMENTS

| | | | |
|---|---|---|---|
| 2007/0162550 A1* | 7/2007 | Rosenberg | H04L 51/04 |
| | | | 709/206 |
| 2011/0121991 A1 | 5/2011 | Basir | |
| 2014/0012494 A1* | 1/2014 | Cudak | G01C 21/3415 |
| | | | 701/412 |
| 2015/0002313 A1* | 1/2015 | Caskey | G08G 1/0965 |
| | | | 340/902 |
| 2015/0381551 A1 | 12/2015 | Cai et al. | |
| 2017/0066374 A1* | 3/2017 | Hoye | G08B 21/06 |
| 2018/0001899 A1* | 1/2018 | Shenoy | B60W 40/09 |

OTHER PUBLICATIONS

Julien Vermillard, "M2M, IoT, Device management: one protocol to rule them all?—EclipseCon 2014", https://www.slideshare.net/jvermillard/eclipsecon-na-14-one-protocol-to-rule-them-all, Mar. 19, 2014, 50 pages.

* cited by examiner

US 10,373,499 B1

COGNITIVELY FILTERED AND RECIPIENT-ACTUALIZED VEHICLE HORN ACTIVATION

TECHNICAL FIELD

The present invention relates generally to filtering communications and, more specifically, to filtering a communication based on a cognitive analysis of physical events prior to the communication.

BACKGROUND

Most vehicles used for transportation of people are equipped with a horn. While these horns can range from a bulb horn which makes noise when squeezed to a computerized system configured to play a noise, horns are generally configured to make a "honk" sound when used. This sudden "honk" sound can be effective to draw the attention of pedestrians and drivers of other vehicles, and can therefore be used to alert pedestrians and drivers of dangers and other situations requiring the driver or pedestrian's attention. Under certain circumstances, however, such as traffic congestion, the horn can be used as an indicator of frustration, rather than as a means to instruct others to be alert. When several drivers use their horns at essentially the same time, the ambient noise can become clamorous. Rather than causing people to be alert, the resulting horn symphony is merely a source of noise pollution.

SUMMARY

Approaches presented herein enable recipient-actualized internal vehicle-to-vehicle honking. More specifically, an action of a first vehicle is monitored and a communication is obtained from a second vehicle. In response to the obtainment of the communication, it is determined whether the action of the first vehicle violates a rule. In the case that the action of the first vehicle violates a rule, responsive to the communication, a honk indication, perceptible to an occupant of the first vehicle, is actualized inside the first vehicle. In the case that the action of the first vehicle does not violate a rule, the communication from the second vehicle is rejected, and the honk indication is not actualized inside the first vehicle. A response can be transmitted to the second vehicle indicating if the honk indication was actualized inside the first vehicle.

One aspect of the present invention includes a method for recipient-actualized internal vehicle-to-vehicle honking, comprising: monitoring an action of a first vehicle; obtaining a communication from a second vehicle; determining, in response to the obtainment of the communication, whether the action of the first vehicle violates a rule; and actualizing, responsive to the communication, in the case that the action of the first vehicle violates a rule, a honk indication inside the first vehicle perceptible to an occupant of the first vehicle.

Another aspect of the present invention includes a computer system for recipient-actualized internal vehicle-to-vehicle honking, the computer system comprising: a memory medium comprising program instructions; a bus coupled to the memory medium; and a processor, for executing the program instructions, coupled to a recipient-actualized internal vehicle-to-vehicle honk engine via the bus that when executing the program instructions causes the system to: monitor an action of a first vehicle; obtain a communication from a second vehicle; determine, in response to the obtainment of the communication, whether the action of the first vehicle violates a rule; and actualize, responsive to the communication, in the case that the action of the first vehicle violates a rule, a honk indication inside the first vehicle perceptible to an occupant of the first vehicle.

Yet another aspect of the present invention includes a computer program product for recipient-actualized internal vehicle-to-vehicle honking, the computer program product comprising a computer readable hardware storage device, and program instructions stored on the computer readable hardware storage device, to: monitor an action of a first vehicle; obtain a communication from a second vehicle; determine, in response to the obtainment of the communication, whether the action of the first vehicle violates a rule; and actualize, responsive to the communication, in the case that the action of the first vehicle violates a rule, a honk indication inside the first vehicle perceptible to an occupant of the first vehicle.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
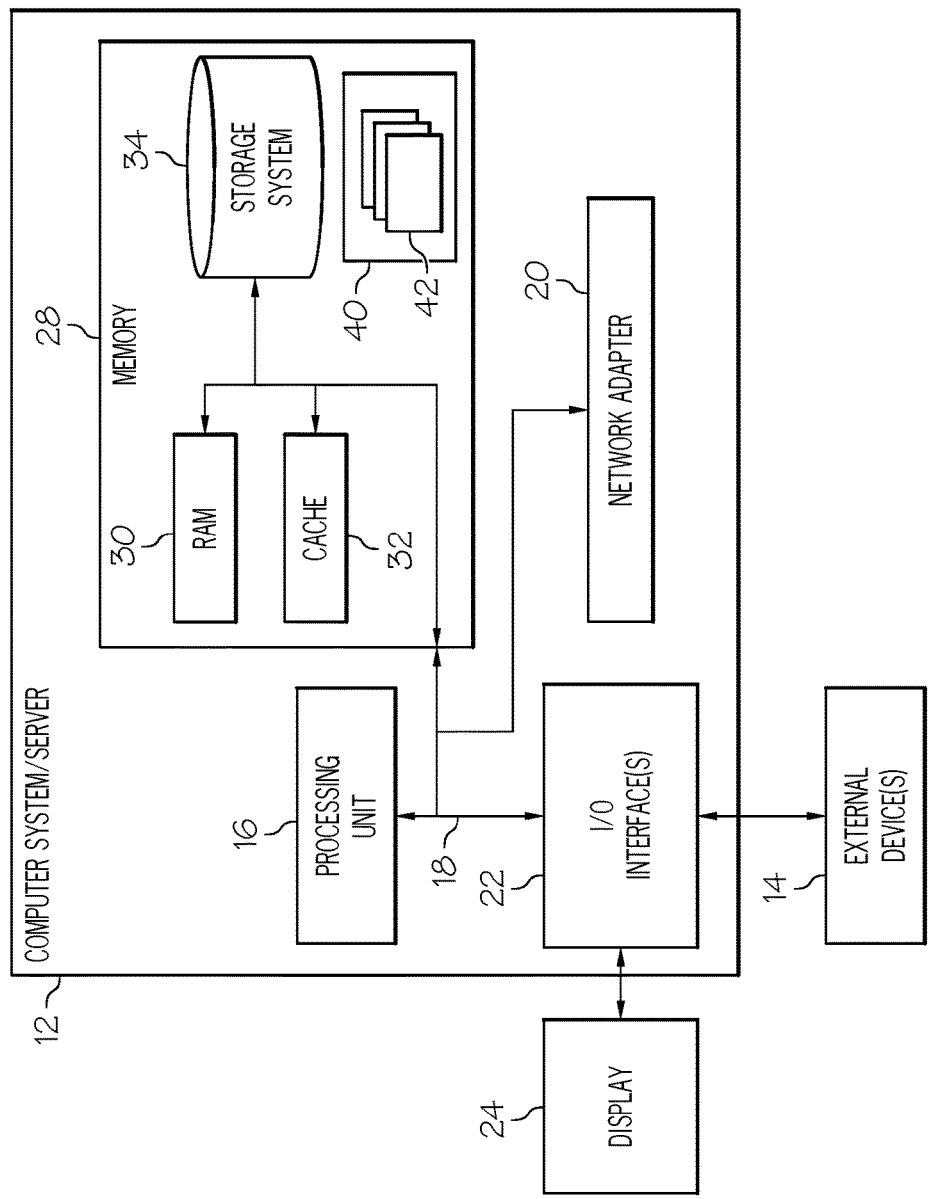
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for recipient-actualized internal vehicle-to-vehicle honking. More specifically, an action of a first vehicle is monitored and a communication is obtained from a second vehicle. In response to the obtainment of the communication, it is determined whether the action of the first vehicle violates a rule. In the case that the action of the first vehicle violates a rule, responsive to the communication, a honk indication, perceptible to an occupant of the first vehicle, is actualized inside the first vehicle. In the case that the action of the first vehicle does not violate a rule, the communication from the second vehicle is rejected, and the honk indication is not actualized inside the first vehicle. A response can be transmitted to the second vehicle indicating if the honk indication was actualized inside the first vehicle.

Referring now to FIG. 1, a computerized implementation 10 of an embodiment for recipient-actualized internal vehicle-to-vehicle honking will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for recipient-actualized internal vehicle-to-vehicle honking. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for recipient-actualized internal vehicle-to-vehicle honking, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that, although the intended purpose of providing a horn on a vehicle is to alert other drivers and/or pedestrians that they are not paying sufficient attention to the road or are about to create a hazard for the honking driver, people often misuse the horn, honking, for example, if they are angry at another driver, to announce a lane change, when entering an intersection, to encourage another driver to go faster, etc. The result can be an almost continuous honking on roadways, such that honking becomes a meaningless source of background noise pollution. An intended recipient of a honk may not even realize a honk was intended for him, while another driver may mistakenly think the honk was intended for her, causing chaos and confusion on the roads, sometimes leading to collisions and other traffic accidents. Furthermore, the noise pollution produced by so many misused horns can have an adverse effect on human health and behavior, such as damage to psychological health, hypertension, high stress levels, tinnitus, hearing loss, sleep disturbances, etc.

Accordingly, the inventors of the present invention have developed a method and system that limits noise pollution from misused honking, while continuing to alert the other drivers when appropriate to avoid collisions and other traffic accidents. Embodiments of the present invention offer a honk communication transmitted from a first vehicle to a second vehicle, with the honk then sounding within the second vehicle. This honk communication is filtered based on behavior of the second vehicle. If the second vehicle has made an error that would warrant a honk, then the honk is sounded within the second vehicle. If however, the second vehicle has made no error, then the honk communication is blocked and no honk sounds within the second vehicle.

The recipient-actualized internal vehicle-to-vehicle honking of embodiments of the present invention offers several advantages over a traditional honk that is sounded publically and indiscriminately. For instance, embodiments of the present invention allow an intended recipient to be notified of a danger or driver error, while not bothering bystanders with the sound of a honk. Furthermore, honks from drivers who are misusing the horn, such as to express frustration or anger at a lawfully operating vehicle, can be filtered out, and, therefore, are not bothersome to the driver of the lawfully operating vehicle or other bystanders. The recipient-actualized internal vehicle-to-vehicle honking of embodiments of the present invention also offers advantages over computerized systems that directly tell a vehicle operator when he or she has made an error. A vehicle operator can become desensitized to the warnings of computer. However, a honk from a human operator/occupant of another vehicle on the road is significantly more difficult to ignore, particularly if the vehicle operator has confirmation that the honk is directed at him or herself.

Figure 2:
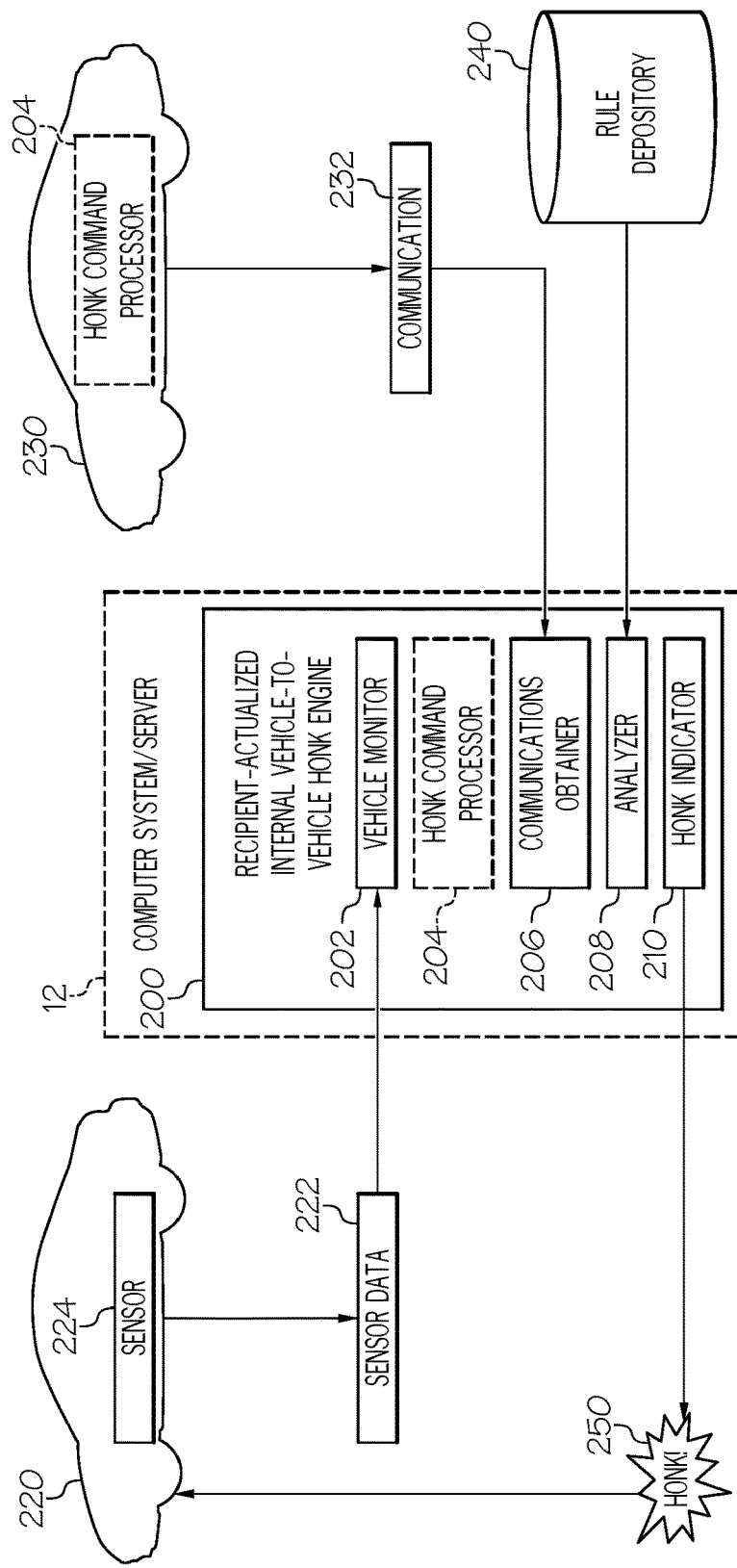
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment). A stand-alone computer system/server 12 is shown in FIG. 2 for illustrative purposes only. In the event the teachings recited herein are practiced in a networked computing environment, each client need not have a recipient-actualized internal vehicle-to-vehicle honk engine 200 (hereinafter "system 200"). Rather, all or part of system 200 could be loaded on a server or server-capable device that communicates (e.g., wirelessly) with the clients to provide for recipient-actualized internal vehicle-to-vehicle honking. Regardless, as depicted, system 200 is shown within computer system/server 12. In general, system 200 can be implemented as program/utility 40 on computer system 12 of FIG. 1 and can enable the functions recited herein.

Along these lines, system 200 may perform multiple functions similar to a general-purpose computer. Specifically, among other functions, system 200 can filter a honk communication based on a cognitive analysis of physical events prior to the communication in a networked computing environment. To accomplish this, system 200 can include a set of components (e.g., program modules 42 of FIG. 1) for carrying out embodiments of the present invention. These components can include, but are not limited to, vehicle monitor 202, communications obtainer 206, analyzer 208, and honk indicator 210. In some embodiments, but not all, system 200 can also include honk command processor 204. In some other embodiments, honk command processor 204 can reside on a separate computer system/server than computer system/server 12 on which system 200 resides. In still other embodiments, some instances of system 200 can include honk command processor 204, while others do not.

In some embodiments, all or portions of system 200 can reside on a computer system of vehicle 220. In some other embodiments, all or portions of system 200 can reside on a portable computer system (e.g., a smart phone or other personal/mobile device) that is a separate computer system than the computer system of vehicle 220. In still other embodiments, all or portions of system 200 can reside on a remote computer system, such as a remote server or virtual machine existing in a cloud computing environment.

Regardless, system 200 can receive sensor data 222 from sensor array 224. Sensors of sensor array 224 can be configured to take various readings associated with first vehicle 220, such as speed, location, physical surroundings, etc. System 200 can also receive or otherwise obtain honk communication 232 from second vehicle 230. To analyze honk communication 232, system 200 can reference rules stored in rule depository 240. In some embodiments, rule depository 240 can be a component of storage system 34 of computer system/server 12. In some other embodiments, rule depository 240 can be a separate storage area from computer system/server 12 and can, in some embodiments, be a cloud storage area in a cloud computing environment. If the analysis validates honk communication 232, then system 200 can cause a sound system or other sensory system of first vehicle 220 to actualize honk 250.

Figure 3:
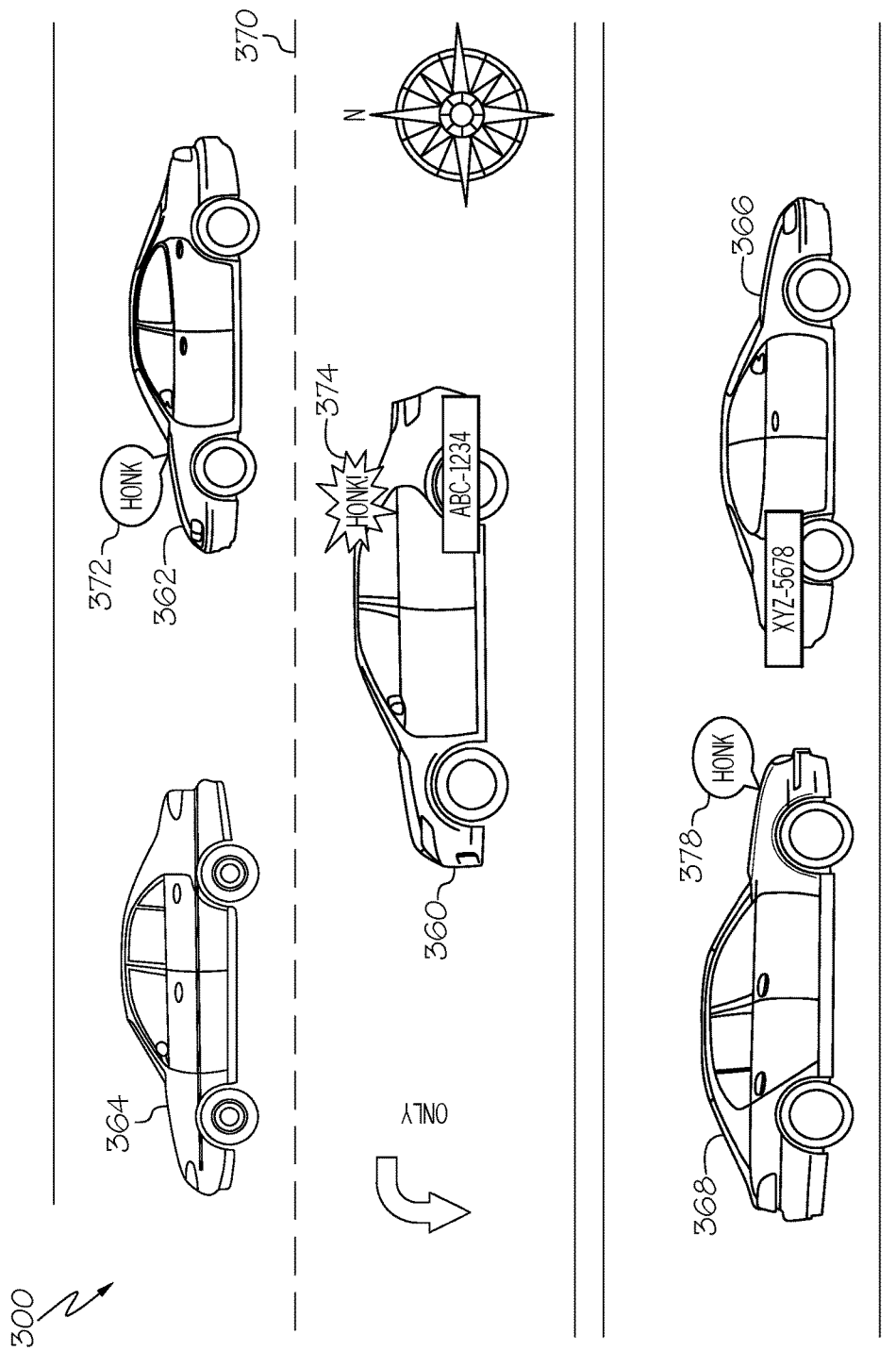
FIG. 3 shows an illustrative example according to illustrative embodiments.

Referring now to FIG. 3 in connection with FIG. 2, an illustrative example 300 of embodiments of the present invention with reference to system 200 will be discussed. Vehicle monitor 202 of system 200, as performed by computer system/server 12, can monitor an action of first vehicle 220 (e.g., vehicle 360 and vehicle 366). In some embodiments, first vehicle 220 can be one of a plurality of vehicles being monitored. This monitoring can be achieved through one or more sensors in sensor array 224 on, in, and/or around first vehicle 220. Such sensors may include, but are not limited to, a camera, a proximity sensor, a speedometer, an accelerometer, a compass, a location sensor (e.g., based on a Global Positioning System (GPS)), etc. Additionally, or in the alternative, such sensors 224 may include internal, driver/occupant monitoring sensors, such as, but not limited to, a camera (e.g., for identifying objects or actions which may distract a driver while driving, such as use of a mobile device, or an eye-line of the driver not being directed at the road) or a biometric sensor (e.g., for monitoring heart rate, breathing, etc.). A camera of sensor array 224 can be configured with object recognition software or otherwise have access to an object recognition system for recognizing and identifying objects in and around first vehicle 220. Additionally, or in the alternative, vehicle monitor 202 of can detect settings or engagements of controls within first vehicle 360, such as whether the high beams of vehicle 360 are turned on or whether vehicle 360 is in drive or reverse. In some embodiments, sensor array 224 can additionally or in the alternative include sensors that are not directly on, in, or around first vehicle 220, such as traffic cameras and other sensors monitoring a road/traffic environment.

Additionally, in some embodiments, vehicle monitor 202 can retrieve information about environmental conditions around first vehicle 220. For example, based on a location detected by a location sensor of sensor array 224, vehicle monitor 202 can retrieve current weather or road condition data about the detected location from an Internet-accessible weather/road condition information source. In another example, based on a location detected by a location sensor of sensor array 224, vehicle monitor 202 can retrieve road rules (e.g., a speed limit) associated with the detected location from an Internet-accessible rule information source, such as, but not limited to, rule depository 240.

In some embodiments, vehicle monitor 202 can be configured to create a log of sensor data 222 generated by sensor array 224. In some embodiments, this log can be temporary. For instance, vehicle monitor 202 can be configured to store the previous minute of sensor data 222 before discarding expired sensor data 222, although this need not be the case. Additionally, in some embodiments, vehicle monitor 202 can log prevailing conditions around first vehicle 220 for an appropriate time period (e.g., update weather information every five minutes).

Turning to illustrative example 300 in FIG. 3, vehicle monitor 202 logs the location, speed, and direction of vehicle 360, as well as the proximity of vehicles 362 and 364 relative to vehicle 360 through sensor array 224 attached to vehicle 360. Vehicle monitor 202 associated with vehicle 360 detects that the right turn signal of vehicle 360 has been engaged, the heading of vehicle 360 has been altered to maneuver into the right-hand lane of west-bound road 370, and that vehicle 362 is currently in the space into which vehicle 360 is attempting to maneuver. Vehicle monitor 202 further learns, from a camera of sensor array 224 or from a road rules database, that the left-hand lane of west-bound road 370 is a left-hand turn only lane. At about the same time, vehicle monitor 202 logs the location, speed, and direction of vehicle 366, as well as the proximity of vehicle 368 behind vehicle 366 through sensor array 224 attached to vehicle 366. Vehicle monitor 202 associated with vehicle 366 detects that vehicle 366 is going the speed limit for road 370 and that vehicle 368 is less than two car lengths behind vehicle 366.

Honk command processor 204 can receive, process, and transmit an auditory command in a natural language identifying first vehicle 220 by an occupant of second vehicle 230. Honk command processor 204 can be configured to receive an auditory/voice command from a driver/occupant of second vehicle 230 to honk at vehicle 220. In some embodiments, this command identifies first vehicle 220 as the vehicle at which the driver/occupant of second vehicle 230 wants to honk. This identification can be in a natural language and can reference, for example, but not limited to, a plate of first vehicle 220, a color of the first vehicle 220, a make and/or model of first vehicle 220, a location of first vehicle 220 (e.g., front, back, left, right), etc. With reference to the illustrative example 300 in FIG. 3, an example of such an auditory/voice command from the driver/occupant of vehicle 362 directed to vehicle 360 may be: "Honk ABC-1234," "Honk ABC," "Honk 1234," "Honk black car," "Honk left," etc. Similarly, an example of such an auditory/voice command from the driver/occupant of vehicle 368 directed to vehicle 366 may be: "Honk XYZ-5678," "Honk XYZ," "Honk 5678," "Honk front," etc. Command processor 204 can parse the voice command to discover information identifying first vehicle 220 as the vehicle at which the honk is intended.

Alternatively or additionally, in some embodiments, the identification of first vehicle 220 as the vehicle the driver/occupant of second vehicle 230 wants to honk at can be non-auditory. For example, in some embodiments, honk command processor 204 can be configured to detect that driver/occupant of second vehicle 230 has pressed a honk button (e.g., a steering wheel horn) and to determine from sensors in, on, or around second vehicle 230 which vehicle of a plurality of vehicles around second vehicle 230 the honk is intended for, using the same rule violation analysis techniques discussed below with respect to analyzer 208. In other words, in some embodiments, honk command processor 204 can be configured to monitor the activity of a plurality of vehicles around second vehicle 230 and identify first vehicle 220 based on a monitored violation of a rule by first vehicle 220. In still other embodiments, honk command processor 204 can be configured to detect/track eye movement of the driver/occupant of second vehicle 230 (e.g., using a camera) and to identify first vehicle 220 for which the honk is intended based on what vehicle the eyes of driver/occupant of second vehicle 230 were looking at when the driver/occupant of second vehicle 230 gave an auditory honk command or pressed a honk command button.

Based on the auditory or detected identifying information, honk command processor 204 can identify first vehicle 220. This identification can use any technique presently known or later developed. For instance, in embodiments where second vehicle 230 has a camera, honk command processor 204 can identify first vehicle 220 from an image of first vehicle 220 taken by that camera. In other embodiments, first vehicle 220 can be broadcasting identifying information about first vehicle 220 (e.g., color, make, model, plate), such that honk command processor 204 can match the parsed identifying information from the auditory/voice command to the identifying information broadcast by first vehicle 220. In still other embodiments where system 200 is centralized, honk command processor 204 can cross-reference the parsed identifying information with other monitored vehicles in the immediate vicinity of second vehicle 230. In any case, honk command processor 204 can identify first vehicle 220 in some embodiments in which the auditory/voice command from the driver/occupant of second vehicle 230 contains information identifying first vehicle 220.

In some embodiments, a honk command does not identify any vehicle as the vehicle at which the driver/occupant of second vehicle 230 wants to honk. For instance, the driver/occupant of second vehicle 230 may only say "Honk" or may signal the desire to honk nonverbally, such as by pressing a horn button in second vehicle 230. With reference to the illustrative example 300 in FIG. 3, an example of such an auditory/voice command from vehicle 362 that does not identify another vehicle may be: "Honk." Honk command processor 204 can parse this voice command to determine that the driver/occupant of vehicle 362 wants to honk at an unspecified someone.

Honk command processor 204 publishes the honk command as communication 232. In some embodiments, in cases where honk command processor 204 has identified first vehicle 220 as the vehicle at which the driver/occupant of second vehicle 230 wants to honk, communication 232 can include this identifying information as metadata accompanying communication 232. Additionally or in the alternative, honk command processor 204 can communicate communication 232 to first vehicle 220 using a machine-to-machine (M2M) protocol. In some other embodiments, in cases where honk command processor 204 has not identified first vehicle 220 as the vehicle at which the driver/occupant of second vehicle 230 wants to honk, honk command processor 204 can publish communication 232 as a generic honk communication directed to any and all vehicles in the immediate vicinity of second vehicle 230. In some embodiments, honk command processor 204 can include metadata identifying second vehicle 230 and/or a location of vehicle 230 (e.g., relative to first vehicle 220) in the published communication 232.

With reference to the illustrative example 300 in FIG. 3, after the driver of vehicle 362 says, "Honk ABC," honk command processor 204 can determine that this command references vehicle 360 and publish honk communication 372 with instructions to honk and metadata identifying vehicle 360. Similarly, after the driver of vehicle 368 says, "Honk front," honk command processor 204 can determine that this command references vehicle 366 and communicate communication 378 to vehicle 366 with instructions to honk.

It should be understood that, although embodiments of the present invention enable a point-and-honk property between two vehicles, second vehicle 230 can still be equipped with a traditional horn that produces a sound heard by everyone in the immediate vicinity of vehicle 230. A traditional horn can be used when alerting entities that are not equipped to perform a recipient-actualized internal vehicle-to-vehicle honk according to embodiments of the present invention, such as pedestrians, cyclists, and animals.

Communications obtainer 206 of system 200, as performed by computer system/server 12, can obtain communication 232 from second vehicle 230. In some embodiments, communications obtainer 206 can receive communication 232 as a transmission via a M2M protocol from second vehicle 230 (or a computer system associated with second vehicle 230). In such embodiments, communications obtainer 206 can obtain communication 232 through an exclusive M2M protocol for on-point honking between second vehicle 230 and first vehicle 220 (or between two computer systems, each associated with one of the vehicles). Communications obtainer 206 can be a dedicated port of system 200 configured to "listen" for honk communications 232 from other vehicles. In some embodiments, communications obtainer 206 can be configured to "listen" specifically for honk communications 232 having identifying information attached to communication 232 as metadata that matches an identity of first vehicle 220. In this embodiment, communications obtainer 206 can be configured to disregard any communication 232 that identifies a vehicle other than first vehicle 220 as the intended vehicle. Additionally or alternatively, communications obtainer 206 can be configured to obtain a general honk communications 232 that does not contain any vehicle identifying information, after which system 200 can treat this general honk communications 232 as though intended for vehicle 220, testing, as described below, whether vehicle 220 has violated a rule to warrant being honked at.

With reference to the illustrative example 300 in FIG. 3, communications obtainer 206 of system 200 associated with vehicle 360 receives honk communication 372, as published by honk command processor 204. This is enabled because honk communication 372 contains metadata identifying vehicle 360 that communications obtainer 206 can use to determine that honk communication 372 is intended for vehicle 360. Likewise, communications obtainer 206 of system 200 associated with vehicle 366 receives honk communication 378, as published by honk command processor 204. Although this is enabled because honk communication 378 contains metadata identifying vehicle 366 as the intended recipient of honk communication 378, communications obtainer 206 could also obtain honk communication 378 if honk communication 378 were directed generally to any vehicle in proximity to vehicle 368.

Analyzer 208 of system 200, as performed by computer system/server 12, can determine, in response to the obtainment of communication 232, whether the action of first vehicle 220 violates a rule. Although analyzer 208 will be discussed here as performing this determination in response to communications obtainer 206 receiving communication 232, it should be understood that in some embodiments of the present invention, analyzer 208 determines, based only on the monitoring of an action of first vehicle 220 by vehicle monitor 202 and the collection of information regarding circumstances around first vehicle 220, whether the action of first vehicle 220 violates a rule.

Analyzer 208 is configured to cognitively analyze sensor data 222 and/or the retrieved information about environmental conditions (e.g., weather, temporary road conditions such as construction, detours, stopped vehicles, etc.) around first vehicle 220 as a set of parameters describing the actions of, around, and within first vehicle 220. These parameters are compared to a set of rules (e.g., from rule depository 240) the violation of which constitutes an unsafe action when driving/operating a vehicle. In some embodiments, these rules can be a set of conditions and a set of actions or inactions that, under the conditions, are safe or unsafe for a vehicle or an operator of a vehicle to perform while driving. In still further embodiments, these rules can be a set of binary questions, a yes or no answer constituting an action or inaction that, under the conditions, is safe or unsafe for a vehicle or an operator of a vehicle to perform while driving.

Analyzer 208 can further generate a hypothesis as to why the operator of second vehicle 230 honked at first vehicle 220. This hypothesis can be based on which of the rules, if any, the actions of first vehicle 220 have violated. In some embodiments, this hypothesis is a statement of the violated rule. Additionally or in the alternative, the hypothesis can contain an instruction/advice on what first vehicle 220 or the driver of the same should do to avoid continuing to violate this rule or to avoid violating this rule in the future.

It will be understood that analyzer 208 can apply many different rules to the driving parameters of first vehicle 220. These rules can, for example, regard traffic laws, driving customs, and other rules dictating how a vehicle should be driven/operated. As this allows for a vast number of rules, they will not be iterated here. However, the following are some examples of the types of rule inquiries analyzer 208 can perform when comparing the parameters of the vehicle's actions against the set of rules.

a) Is the vehicle moving as per expected lane rules? Is the vehicle in the correct traffic lane?

b) Is the vehicle deviating from expected driving patterns? Is the vehicle breaking, slowing down, or going slow if the road ahead is empty?

c) Is the driver of the vehicle distracted? Is the driver using a handheld device, a smart device, a mobile phone, etc.?

d) Is the speed of the vehicle above/below the speed limit beyond a pre-defined tolerance?

e) Is the vehicle failing to give way for vehicles behind the vehicle to pass if there is room to overtake?

f) Is the vehicle's driving pattern as expected as per current external/environmental conditions?

G) Is the vehicle failing to stop, yield, etc., at traffic signs, signals, rotaries, etc.?

Figure 4:
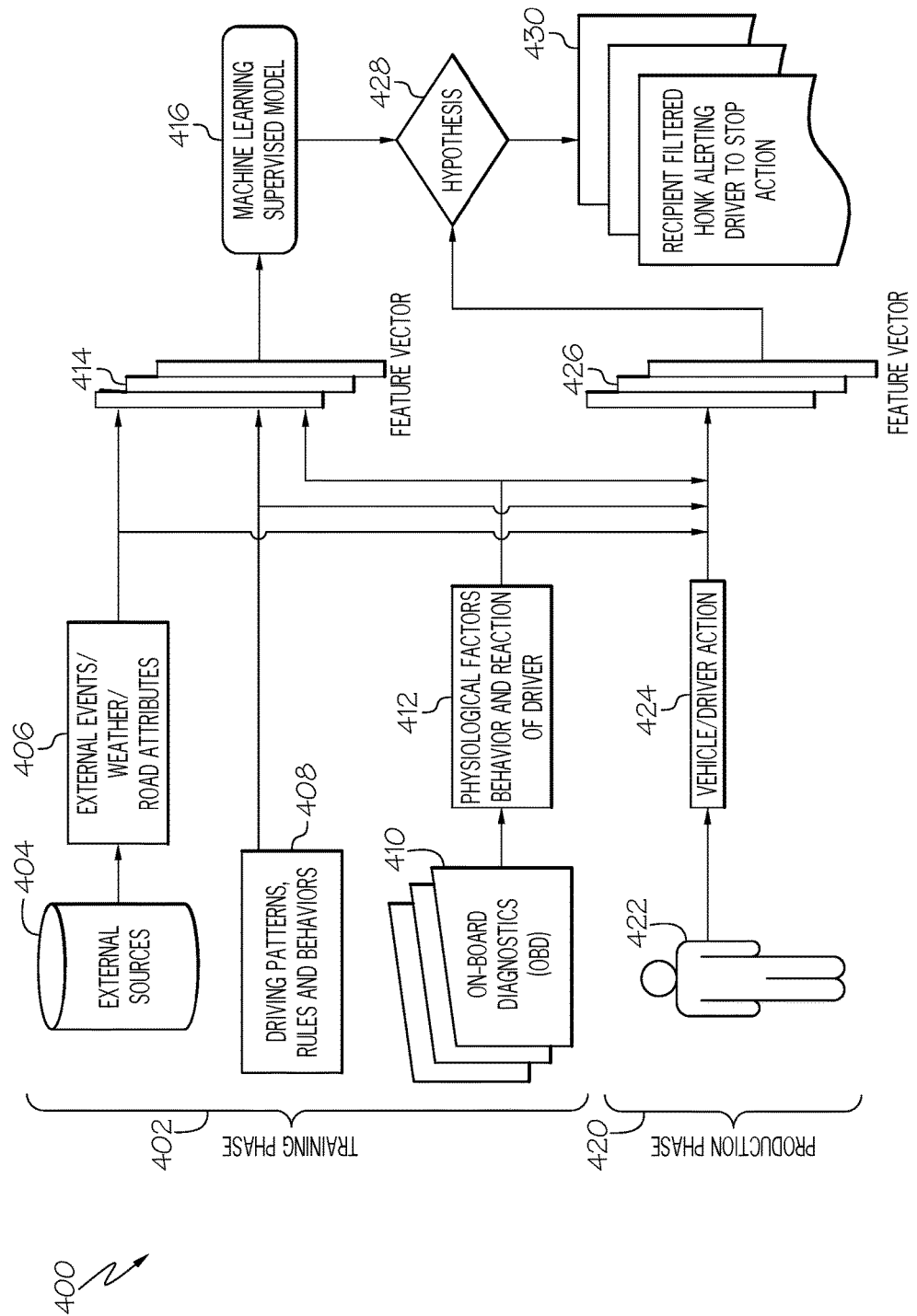
FIG. 4 shows a system training flowchart according to illustrative embodiments.

Referring now to FIG. 4 in connection with FIG. 2 and FIG. 3, according to some embodiments of the present invention, analyzer 208 can be trained to apply driving rules to the actions of first vehicle 220, as shown in training flow diagram 400. During training phase 402, analyzer 208 can be trained to recognize training feature vector 414. This training feature vector 414 can describe actions and circumstances surrounding first vehicle 220. Analyzer 208 can be trained to associate training feature vector 414 with hypothesis 428. This means that analyzer 208 can learn to associate particular actions and circumstances surrounding first vehicle 220 with a likely reason a driver/occupant of second vehicle 230 would be honking at first vehicle 220. Training feature vector 414 can include parameters from external sources 404, such as external events, weather, and road attributes 406. Additionally or in the alternative, training feature vector 414 can include parameters describing driving patterns, rules, and/or behaviors 408 expected of a vehicle/driver. As discussed above, these can be retrieved from rule depository 240 or another external source. Additionally or in the alternative, training feature vector 414 can include parameters from on-board diagnostics (OBD) 410, such as sensor data 222, including data indicative of physiological factors, behavior, and driver reaction 412. Analyzer 208 can learn to recognize these parameters as part of machine learning supervised model 416 and, then, learn to associate a particular set of parameters with a particular reason-for-honking hypothesis 428.

Still referring to FIG. 4, during runtime/prediction phase 420, analyzer 208 can refer back to the associations developed during training phase 402 to best associate runtime feature vector 426, describing current vehicle and/or driver actions 424 of a driver/occupant 422 of first vehicle 220, with a particular reason-for-honking hypothesis 428. In the case that a particular reason-for-honking hypothesis 428 is found, honk 250 can be accompanied by message 430 informing driver/occupant 422 of first vehicle 220 of the likely reason the driver/occupant of second vehicle 230 honked at first vehicle 220.

Referring again to the illustrative example provided in FIG. 3, analyzer 208 reviews sensor data 222 collected by vehicle monitor 202, namely that the right turn signal of vehicle 360 has been engaged, the heading of vehicle 360 has been altered to maneuver into the right-hand lane of west-bound road 370, and vehicle 362 is currently in the space into which vehicle 360 is attempting to maneuver. From these parameters, analyzer 208 determines that the right rear side of vehicle 360 is about to come into contact with the left front fender of vehicle 362 if vehicle 360 continues on its current course. Analyzer 208 also determines that the speed of vehicle 360 currently exceeds the posted speed limit by 5 mph. Therefore, analyzer 208 determines that honk 372 from vehicle 362 is valid. Furthermore, although both of these actions of vehicle 360 violate driving rules retrieved from rule depository 240, analyzer 208 cognitively determines that the most likely reason the occupant/driver of vehicle 362 honked at vehicle 360 is because of the prospect of a collision between vehicle 362 and vehicle 360. Therefore, this reason will be provided to the occupant/driver of vehicle 360.

By contrast, still referring to the illustrative example provided in FIG. 3, analyzer 208 reviews sensor data 222 collected by vehicle monitor 202, namely that vehicle 366 is going the speed limit for road 370 and that vehicle 368 is less than two car lengths behind vehicle 366. From these parameters, analyzer 208 determines that no action of vehicle 366 has violated any rule. Therefore, analyzer 208 determines that honk 378 from vehicle 368 is invalid.

Referring again primarily to FIG. 2, honk indicator 210 of system 200, as performed by computer system/server 12, can actualize, responsive to communication 232, in the case that the action of first vehicle 220 violates a rule, honk indication 250 (e.g., honk 374) inside first vehicle 220 perceptible to an occupant of first vehicle 220. In the case that the action of first vehicle 220 does not violate a rule, honk indicator 210 does not actualize honk indication 250 inside first vehicle 220. This honk indication 250 is not heard by any other vehicle in the vicinity of first vehicle 220 and second vehicle 230. In some embodiments, honk indicator 210 can use a dedicated port of computer system/server 12 to actualize honk indication 250.

It will be appreciated that honk indication 250 can be performed any number of ways. In some embodiments, honk indication 250 can be a "honking" sound played by any audio output device associated with vehicle 220. For instance, in some embodiments, this audio output device can be a sound system of first vehicle 220. In some other embodiments, this audio output device can be a sound system of a mobile device associated with first vehicle 220 (e.g., when a driver's mobile device is computer system/server 12). Additionally, or in the alternative, honk indication 250 can be a visual alert shown on a display of vehicle 220 or any device associated with vehicle 220. For example, in some embodiments, this visual alert can be a flashing light or a particularly colored light (e.g., red, yellow) on a dashboard or windshield of first vehicle 220. Additionally, or in the alternative, honk indication 250 can be a form of haptic feedback by an object in contact with the driver/occupant of first vehicle 220. For example, in some embodiments, honk indicator 210 can cause a steering wheel, gear shift, or seat to vibrate or perform another motion.

In some embodiments of the present invention, honk indicator 210 also provides a direction indication of second vehicle 230 relative to first vehicle 220. This direction indication allows a driver/occupant of first vehicle 220 to know from where the honk came and, therefore, the likely direction of a hazard about which the honk is intended to warn the driver/occupant. It will be appreciated that this direction indication can be performed any number of ways. In some embodiments, honk indicator 210 can use a surround sound system of first vehicle 220 (in the case that first vehicle 220 has a surround sound system) to play honk indication 250 from a speaker closest in the direction of second vehicle 230. In some further embodiments, honk indication 250 can vary the left/right and/or front/rear volume of each of the speakers in the surround sound system of first vehicle 220 to provide the direction indication. For instance, if second vehicle 230 is behind first vehicle 220, then honk indicator 210 plays, or causes to be played, honk indication 250 from speakers at the back of the cab compartment of first vehicle 220 or, if second vehicle 230 is to the right of first vehicle 220, then honk indicator 210 plays, or causes to be played, honk indication 250 from speakers on the right side of the cab compartment of first vehicle 220. Additionally or in the alternative, honk indicator 210 can visually indicate a direction of honk indication 250. This visual direction indication can be, for example, a lighted arrow displayed on a dashboard of first vehicle 220. Additionally or in the alternative, honk indicator 210 can haptically indicate a direction of honk indication 250. This haptic direction indication can be, for example, a portion of a driver's seat or steering wheel nearest to second vehicle 230 vibrating or otherwise moving.

In some embodiments of the present invention, honk indicator 210 also provides an importance, priority, or urgency of the honk through honk indication 250. For example, honk indicator 210 can produce, for a more urgent matter (e.g., an imminent collision), a louder, more abrupt sounding honk indication 250. By contrast, honk indicator 210 can produce, for a less urgent matter (e.g., a vehicle traveling above the speed limit), a quieter, softer sounding honk indication 250.

Furthermore, in some embodiments, honk indicator 210 can provide the driver/occupant of first vehicle 220 with a message including reason-for-honking hypothesis 428. Reason-for-honking hypothesis 428 can be displayed to driver/occupant of first vehicle 220 on a dashboard of first vehicle 220. Additionally or alternatively, reason-for-honking hypothesis 428 can be delivered to driver/occupant of first vehicle 220 as audio (e.g., "Warning, unsafe lane change") played through an audio output device of first vehicle 220). In any case, in some embodiments, honk indicator 210 can be configured to disclose the most likely reason first vehicle 220 was honked at in addition to delivering the honk itself.

In some embodiments, honk indicator 210 or analyzer 208 can transmit or cause to be transmitted a return communication to second vehicle 230. This return communication can acknowledge delivery of honk communication 232. Alternatively or additionally, this return communication can indicate whether analyzer 208 found the honk to be valid or invalid. In some embodiments, a computer system of second vehicle 230 can be configured to visually (e.g., with red/green lights on a dashboard of second vehicle 230) or aurally (e.g., with a soft return honk) indicate that honk communication 232 was received and/or honk indication 250 was delivered to the driver/occupant of first vehicle 220.

Referring again to the illustrative example provided in FIG. 3, because analyzer 208 determined that honk 372 sent from vehicle 362 to vehicle 360 is valid, honk indicator 210 plays honk sound effect 374 over the rear right speaker system inside the cabin of vehicle 360. Additionally, honk indicator 210 displays "unsafe lane change" on the dashboard of vehicle 360. The driver of vehicle 362 sees a green light on his dashboard indicating that a honk was presented to the driver/occupant of vehicle 360. The occupants of vehicles 364, 366, and 368 do not hear any honking noise 374 and remain unaware that honk 372 took place.

In contrast, because analyzer 208 determined that honk 378 sent from vehicle 368 to vehicle 366 is invalid, honk indicator 210 does not play any honk sound effect within the cabin of vehicle 366. The driver of vehicle 368 sees a red light on his dashboard indicating that he was incorrect sending honk 378 to the driver/occupant of vehicle 366. The occupants of vehicles 360, 362, 364, and 366 remain unaware that honk 378 took place. Neither correct honk 372 nor erroneous honk 378 creates any noise pollution. Furthermore, the driver/occupant of vehicle 366 is not bothered by the sound of an undeserved honk.

In some further embodiments of the present invention, system 200 can also be configured to alert one or more first vehicles 220 of an action about to be taken by second vehicle 230. In these embodiments, honk command processor 204 can be configured to receive an auditory/voice command from a driver/occupant of second vehicle 230 to send out an alert announcement to one or more first vehicles 220 around or otherwise in proximity to second vehicle 230. In some of these embodiments, this command identifies the action second vehicle 230 will be taking or the reason the driver/occupant of vehicle 230 will be taking that action (e.g., "I'm breaking," "There's an animal in the road," or "I'm breaking because there's an animal in the road"). In some other of these embodiments, this command can be a more generalized instruction to send out an alert announcement to one or more first vehicles 220 around or otherwise in proximity to second vehicle 230 (e.g., "Honk all" or "Broadcast all"). Data from vehicle monitor 202 can be used to identify or confirm the reason for the action of vehicle 230 (e.g., detection of a pothole or animal in the path of vehicle 230). Honk command processor 204 can publish the alert announcement command as a communication and/or communicate the communication to the one or more first vehicles 220 in proximity to second vehicle 230 using a machine to machine (M2M) protocol. In these embodiments, this communication can contain metadata identifying the communication as containing an alert announcement generally directed to all vehicles in a particular area (i.e., in proximity to second vehicle 230). This communication can further contain the action second vehicle 230 will be taking or the reason the driver/occupant of vehicle 230 will be taking that action.

In these embodiments, as discussed above, communications obtainer 206 can obtain the communication from second vehicle 230 (e.g., as a transmission via a M2M protocol from second vehicle 230) and, based on the metadata contained therein, identify the communication as an alert announcement intended for first vehicle 220, among other vehicles. In the case where communications obtainer 206 identifies the communication as a general alert announcement, analyzer 208 does not analyze the general alert announcement communication and does not determine, based on the monitoring of an action of first vehicle 220 by vehicle monitor 202, whether the action of first vehicle 220 violates a rule.

The general alert announcement communication is routed directly to honk indicator 210 from communications obtainer 206. Honk indicator 210 actualizes, responsive to the general alert announcement communication, an announcement alert indication inside first vehicle 220 perceptible to an occupant of first vehicle 220. This announcement alert indication can be an auditory honk, a specialized auditory honk (e.g., a different tone, pitch, or volume than a regular honk), or any other honk indication (e.g., visual or haptic) discussed above. Alternatively or additionally, the announcement alert indication actualized by honk indicator 210 can be a message (e.g., displayed to driver/occupant of first vehicle 220 on a dashboard of first vehicle 220 or delivered to driver/occupant of first vehicle 220 as audio played through an audio output device of first vehicle 220). This message can be or reference the action second vehicle 230 will be taking or the reason the driver/occupant of vehicle 230 will be taking that action transmitted in the general alert announcement communication.

Referring again to the illustrative example provided in FIG. 3, according to some embodiments of the present invention, the driver of vehicle 366 sees a pothole in front of vehicle 366 and says, "Broadcast, there's a pothole in front of me." Honk command processor 204 transmits a message to nearby vehicle 368 that vehicle 366 will be taking some type of evasive action because there is a pothole in the road in front of vehicle 230. Communications obtainer 206 receives this message, recognizes it as a general alert announcement, and passes the message to honk indicator 210. Honk indicator 210 then toots a warning honk inside vehicle 368 and delivers audio over the audio system of vehicle 368 that tells the driver/occupant of vehicle 368 to expect vehicle 366 to take an action to avoid a pothole.

Figure 5:
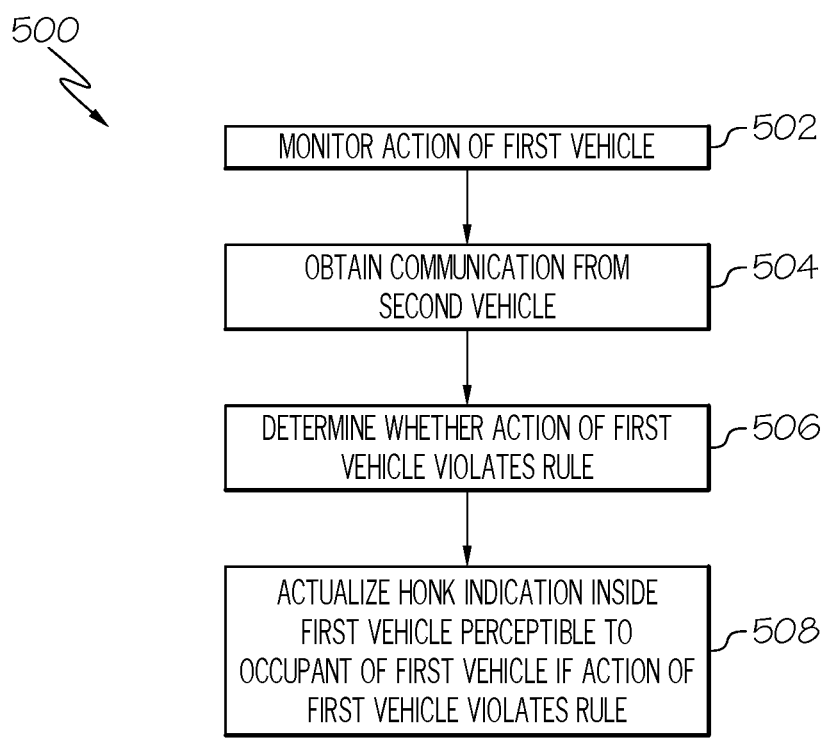
FIG. 5 shows a process flowchart for recipient-actualized internal vehicle-to-vehicle honking according to illustrative embodiments.

As depicted in FIG. 5, in one embodiment, a system (e.g., computer system/server 12) carries out the methodologies disclosed herein. Shown is a process flowchart 500 for recipient-actualized internal vehicle-to-vehicle honking. At 502, vehicle monitor 202 monitors an action of a first vehicle 220. At 504, communications obtainer 206 obtains a communication 232 from a second vehicle 230. At 506, analyzer 208 determines, in response to the obtainment of the communication by communications obtainer 206, whether the action of the first vehicle 220 violates a rule. At 508, honk indicator 210 actualizes, responsive to the communication 232, in the case that the action of the first vehicle 220 violates a rule, a honk indication 250 inside the first vehicle 220 perceptible to an occupant of the first vehicle 220.

Process flowchart 500 of FIG. 5 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for recipient-actualized internal vehicle-to-vehicle honking. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for recipient-actualized internal vehicle-to-vehicle honking. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to recipient-actualized internal vehicle-to-vehicle honking. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for recipient-actualized internal vehicle-to-vehicle honking, comprising:
    monitoring an action of a first vehicle by receiving sensor data from a set of sensors on the first vehicle, the sensor data comprising the action of the first vehicle and a condition associated with the first vehicle;
    obtaining a set of rules from a rule depository, the set of rules being correct conduct of the first vehicle responsive to a condition associated with the first vehicle, wherein the rules comprise a set of cognitively learned driving customs, the violation of which warrants a honk according to the cognitively learned driving customs;
    obtaining a communication from a second vehicle;
    determining, in response to the obtainment of the communication, whether the action of the first vehicle violates a rule by analyzing the sensor data for a violation of a rule of the set of rules for the received action of the first vehicle and condition associated with the first vehicle, the analysis comprising generating a hypothesis proposing a reason an operator of the second vehicle honked at the first vehicle based on a machine-learned association of the sensed action with the hypothesis; and
    actualizing, responsive to the communication, in the case that the action of the first vehicle violates a rule, a honk indication inside the first vehicle perceptible to an occupant of the first vehicle, the actualized honk indication comprising an indication of a direction of the second vehicle relative to the first vehicle.

2. The method of claim 1, the method further comprising, in the case that the action of the first vehicle does not violate a rule, rejecting the communication from the second vehicle by not actualizing the honk indication inside the first vehicle perceptible to the occupant of the first vehicle, wherein the action of the first vehicle occurs prior to obtaining the communication from the second vehicle.

3. The method of claim 2, the method further comprising transmitting a response to the second vehicle, responsive to the communication from the second vehicle, indicating if the honk indication was actualized inside the first vehicle.

4. The method of claim 1, wherein, in the case that the action of the first vehicle violates a rule, the honk indication notifies the occupant of the first vehicle of the rule of the set of rules that has a violation.

5. The method of claim 1, wherein the honk indication comprises at least one indicator selected from the group consisting of: a visual alert on a display of the first vehicle, an auditory alert through a sound system of the first vehicle, and a haptic alert through a surface in physical contact with the occupant of the first vehicle.

6. The method of claim 1, the communication from the second vehicle being in response to an auditory command in a natural language identifying the first vehicle by an occupant of the second vehicle.

7. The method of claim 1, the method further comprising:
obtaining an alert announcement communication from the second vehicle, the alert announcement communication being communicated to a set of vehicles in proximity to the second vehicle;
identifying the alert announcement communication as an alert announcement communication based on metadata associated with the alert announcement communication, wherein the metadata comprises an identification of a location of the second vehicle; and
actualizing, responsive to the alert announcement communication, an alert announcement honk indication inside the first vehicle perceptible to the occupant of the first vehicle.

8. A computer system for recipient-actualized internal vehicle-to-vehicle honking, the computer system comprising:
a memory medium comprising program instructions;
a bus coupled to the memory medium; and
a processor, for executing the program instructions, coupled to a recipient-actualized internal vehicle-to-vehicle honk engine via the bus that when executing the program instructions causes the system to:
monitor an action of a first vehicle by receiving sensor data from a set of sensors on the first vehicle, the sensor data comprising the action of the first vehicle and a condition associated with the first vehicle;
obtain a set of rules from a rule depository, the set of rules being correct conduct of the first vehicle responsive to a condition associated with the first vehicle, wherein the rules comprise a set of cognitively learned driving customs, the violation of which warrants a honk according to the cognitively learned driving customs;
obtain a communication from a second vehicle;
determine, in response to the obtainment of the communication, whether the action of the first vehicle violates a rule by analyzing the sensor data for a violation of a rule of the set of rules for the received action of the first vehicle and condition associated with the first vehicle, the analysis comprising generating a hypothesis proposing a reason an operator of the second vehicle honked at the first vehicle based on a machine-learned association of the sensed action with the hypothesis; and
actualize, responsive to the communication, in the case that the action of the first vehicle violates a rule, a honk indication inside the first vehicle perceptible to an occupant of the first vehicle, the actualized honk indication comprising an indication of a direction of the second vehicle relative to the first vehicle.

9. The computer system of claim 8, the instructions further causing the system to, in the case that the action of the first vehicle does not violate a rule, reject the communication from the second vehicle by not actualizing the honk indication inside the first vehicle perceptible to the occupant of the first vehicle, wherein the action of the first vehicle occurs prior to obtaining the communication from the second vehicle.

10. The computer system of claim 9, the instructions further causing the system to transmit a response to the second vehicle, responsive to the communication from the second vehicle, indicating if the honk indication was actualized inside the first vehicle.

11. The computer system of claim 8, the instructions further causing the system to notify, in the case that the action of the first vehicle violates a rule, the occupant of the first vehicle of the hypothesis.

12. The computer system of claim 8, the communication from the second vehicle being in response to an auditory command in a natural language identifying the first vehicle by an occupant of the second vehicle.

13. The computer system of claim 8, the instructions further causing the system to:
obtain an alert announcement communication from the second vehicle, the alert announcement communication being communicated to a set of vehicles in proximity to the second vehicle;
identify the alert announcement communication as an alert announcement communication based on metadata associated with the alert announcement communication, wherein the metadata comprises an identification of a location of the second vehicle; and
actualize, responsive to the alert announcement communication, an alert announcement honk indication inside the first vehicle perceptible to the occupant of the first vehicle.

14. A computer program product for recipient-actualized internal vehicle-to-vehicle honking, the computer program product comprising a computer readable hardware storage device, and program instructions stored on the computer readable hardware storage device, to:
monitor an action of a first vehicle by receiving sensor data from a set of sensors on the first vehicle, the sensor data comprising the action of the first vehicle and a condition associated with the first vehicle;
obtain a set of rules from a rule depository, the set of rules being correct conduct of the first vehicle responsive to a condition associated with the first vehicle, wherein the rules comprise a set of cognitively learned driving customs, the violation of which warrants a honk according to the cognitively learned driving customs;
obtain a communication from a second vehicle;
determine, in response to the obtainment of the communication, whether the action of the first vehicle violates a rule by analyzing the sensor data for a violation of a rule of the set of rules for the received action of the first vehicle and condition associated with the first vehicle, the analysis comprising generating a hypothesis proposing a reason an operator of the second vehicle honked at the first vehicle based on a machine-learned association of the sensed action with the hypothesis; and
actualize, responsive to the communication, in the case that the action of the first vehicle violates a rule, a honk indication inside the first vehicle perceptible to an occupant of the first vehicle, the actualized honk indication comprising an indication of a direction of the second vehicle relative to the first vehicle.

15. The computer program product of claim 14, the computer readable storage device further comprising instructions to, in the case that the action of the first vehicle does not violate a rule, reject the communication from the second vehicle by not actualizing the honk indication inside the first vehicle perceptible to the occupant of the first vehicle, wherein the action of the first vehicle occurs prior to obtaining the communication from the second vehicle.

16. The computer program product of claim 15, the computer readable storage device further comprising instructions to transmit a response to the second vehicle, responsive to the communication from the second vehicle, indicating if the honk indication was actualized inside the first vehicle.

17. The computer program product of claim 14, the computer readable storage device further comprising instructions to notify, in the case that the action of the first vehicle violates a rule, the occupant of the first vehicle of the hypothesis.

18. The computer program product of claim 14, the communication from the second vehicle being in response to an auditory command in a natural language identifying the first vehicle by an occupant of the second vehicle.

19. The computer program product of claim 14, the computer readable storage device further comprising instructions to:

obtain an alert announcement communication from the second vehicle, the alert announcement communication being communicated to a set of vehicles in proximity to the second vehicle;

identify the alert announcement communication as an alert announcement communication based on metadata associated with the alert announcement communication, wherein the metadata comprises an identification of a location of the second vehicle; and actualize, responsive to the alert announcement communication, an alert announcement honk indication inside the first vehicle perceptible to the occupant of the first vehicle.

\* \* \* \* \*